United States Patent [19]
Yasumoto et al.

[11] Patent Number: 5,607,227
[45] Date of Patent: Mar. 4, 1997

[54] LINEAR LIGHT SOURCE

[75] Inventors: Masami Yasumoto, Tottori-ken;
Tatsuya Motoike, Tottori, both of Japan

[73] Assignees: Sanyo Electric Co., Ltd., Moriguchi;
Tottori Sanyo Electric Co., Tottori, both of Japan

[21] Appl. No.: 295,168

[22] Filed: Aug. 24, 1994

[30] Foreign Application Priority Data

Aug. 27, 1993 [JP] Japan ................................. 5-212812
Aug. 30, 1993 [JP] Japan ................................. 5-214093
Aug. 31, 1993 [JP] Japan ................................. 5-216442

[51] Int. Cl.$^6$ ............................................. F21V 29/00
[52] U.S. Cl. .......................... 362/249; 362/294; 362/800; 257/100
[58] Field of Search ......................... 362/235, 240, 362/241, 244, 245, 249, 800, 294, 373; 313/502, 500; 257/81, 98, 99, 100

[56] References Cited

U.S. PATENT DOCUMENTS 5,008,788  4/1991  Palinkas ................................. 362/800
5,161,872  11/1992  Sasaki et al. .......................... 362/800
5,436,809  7/1995  Brassier et al. ........................ 362/249

FOREIGN PATENT DOCUMENTS 1001067   1/1986  Japan ..................................... 257/100
63-131157  8/1988  Japan .
2-37784    2/1990  Japan .
2-215171   8/1990  Japan .
3-110963   5/1991  Japan .
4-44368    2/1992  Japan .
5-199368   8/1993  Japan .

*Primary Examiner*—Y. My Quach
*Attorney, Agent, or Firm*—Nikaido, Marmelstein, Murray & Oram LLP

[57] ABSTRACT

Grooves are formed along the length inside a frame member formed by integrating a lens and reflecting frames. A base plate on which light emitting diodes are arranged in a line is held in the frame member by being inserted in the grooves. The lower part of the frame member is open so that heat is released directly from the base plate, thereby preventing the warp of the base plate and the frame member due to an increase in temperature.

4 Claims, 8 Drawing Sheets

LINEAR LIGHT SOURCE

BACKGROUND OF THE INVENTION

1. Field of the Invention

The present invention relates to a semiconductor light source, and more particularly, to a linear light source for use in an electrographic copying machine and a facsimile machine.

2. Description of the Prior Art

A linear light source including a plurality of semiconductor light emitting devices arranged linearly is frequently used as an original irradiating light source and as a charge removing light source in an image forming apparatus such as an electrographic copying machine and a facsimile machine. A general arrangement of the linear light source is such that the semiconductor light emitting devices are arranged on a long and narrow base plate and used in combination with a lens for condensing light emitted from the semiconductor light emitting devices.

Figure 1:
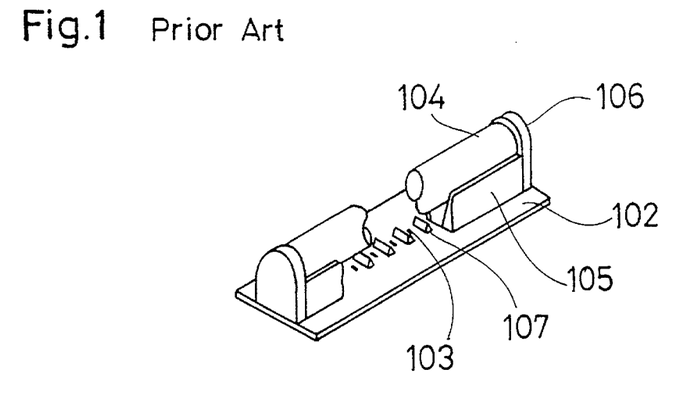
FIG. 1 is a perspective view showing a conventional linear light source.

Referring to FIG. 1, there is shown a conventional linear light source. On the surface of a base plate 102, light emitting diodes 103 are arranged in a line with predetermined spaces. Above the light emitting diodes 103, a bar lens 104 is arranged for condensing light emitted from the light emitting diodes 103. The bar lens 104 has both ends fixed to holders 106. On both sides of the line of the light emitting diodes 103, reflecting frames 105 are arranged to reflect scattered light toward the bar lens 104. On the base plate 102, reflecting plates 107 are arranged between the light emitting diodes 103. To assemble the conventional light source, first, the light emitting diodes 103 are arranged on the base plate 102, and then, the bar lens 104, the holders 106 and the reflecting frames 105 which are formed separately are fixed. According to this manner, however, a high assembling technique is required to arrange the parts at respective positions.

Figure 2:
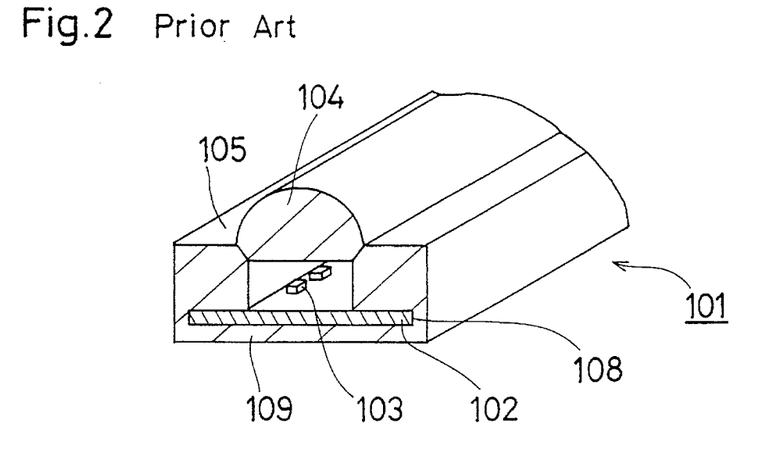
FIG. 2 is a cross-sectional perspective view showing a second conventional linear light source.

To solve this problem, Japanese Laid-open Patent Application No. H2-215171 discloses to integrate the lens and the reflecting frames into a frame member for holding therein the base plate on which the light emitting diodes are arranged. A linear light source structured by this method is shown in FIG. 2. The bar lens 104 and the reflecting frames 105 which are made of different resin materials are integrated into a frame member 101 by two-color continuous extrusion method. In the inner surface of the frame member 101, grooves 108 for inserting the base plate 102 therein are formed along the length. The base plate 102 on which the light emitting diodes 103 are arranged is held in the frame member 101 by being inserted in the grooves 108.

In the linear light source of this structure, since the base plate 102 is held in the frame member 101 while being substantially in close contact with the reflecting frames 105 and since the reflecting frames 105 and the bar lens 104 are integrated, it is unnecessary to adjust the positions of the base plate 102 and the bar lens 104, thereby simplifying the assembling process. In addition, since there are no gaps through which dust such as paper dust intrudes, the interior does not become dirty.

However, since the base plate 102 is surrounded on its upper, lower, right and left sides by the frame member 101, it is impossible to release the heat generated when the light emitting diodes are activated. For this reason, the temperature of the base plate 102 becomes high, so that the base plate 102 warps along the length due to thermal expansion. Since the base plate 102 is substantially in close contact with the grooves 108 of the frame member 101, the warp of the base plate 102 works on the frame member 101 to warp it. The frame member 101 warps easily since thermal expansion is not uniform owing to the fact that the frame member 101 is thin at its base 109 whereas it has the thick bar lens 104 at its top. The heat accumulated inside the frame member 101 is transmitted to the frame member 101 to increase the temperature thereof, so that the frame member 101 warps. If the frame member 101 warps, the distance from the light source to the light irradiated surface will become non-uniform. Then, the irradiation width and the illuminance will become non-uniform. This means that the performance of the linear light source deteriorates.

The base plate 102 is in contact with the frame member 101 at both sides of its upper surface, at its both sides and at the entire of its bottom surface. Thus, the base plate 102 and the frame member 101 are in contact in a large area. In assembly, the base plate 102 is inserted into the groove 108 from one end of the frame member 101. However, since the frictional resistance is large because of the large area of contact, the base plate 102 may not be inserted smoothly. The insertion of the base plate 102 is facilitated by forming the groove 18 to be slightly larger than the base plate 102. However, the base plate 102 still warps because of the increase in temperature. In this case, the distance between the light emitting diodes 103 and the bar lens 104 becomes non-uniform. If the distance becomes non-uniform, the irradiation width of the light condensed by the bar lens 104 will become non-uniform, and the illuminance will also become non-uniform.

To supply power to the light emitting diodes, it is necessary to arrange a pair of conductive patterns on the base plate. In a very long linear light source, a problem arises in arranging the conductive patterns. The conductive patterns are provided on both sides along the line of the light emitting diodes 103. Generally, each of the light emitting diodes is placed on an electrode connected to the first conductive pattern, and connected to the second conductive pattern by a bonder by using a metallic fine wire. However, the size of the base plate is normally limited to A3 size paper sheets or smaller because of the capability of the bonder. A linear light source longer than that is formed by linking a plurality of base plates along the length. In this case, the pair of conductive patterns is required in a number corresponding to the number of base plates, and it is necessary to arrange the necessary number of conductive patterns at both sides of the base plates. This increases the width of the base plates. The longer the linear light source is, i.e. the more number of base plates are linked, the wider the base plates are to increase the size of the light source.

It is desirable for a linear light source to have an illuminance which is high and uniform along the entire length. Since the light emitted from the light emitting diodes proceeds toward the sides as well as toward the lens, the quantity of light used for irradiation is limited. To reflect the light proceeding to the sides toward the lens, reflecting frames are frequently used which are formed to have inner surfaces inclining so that the width of the interior increases from the base plate toward the lens. The quantity of irradiated light is also increased by arranging the reflecting plates 107 as shown in FIG. 1, or by applying a reflecting coat on the upper surface of the base plate on which the light emitting diodes are arranged to thereby reflect the scattered light. Further, it is known from Japanese Laid-open Utility Model Application S63-131157 that the quantity of available light is increased by covering the surfaces of the light emitting diodes with a coating resin. These methods are all effective in increasing the illuminance and the illuminance is largely increased by using them in combination. However, by these methods, it is difficult to maintain the uniformity of the illuminance.

Figure 3:
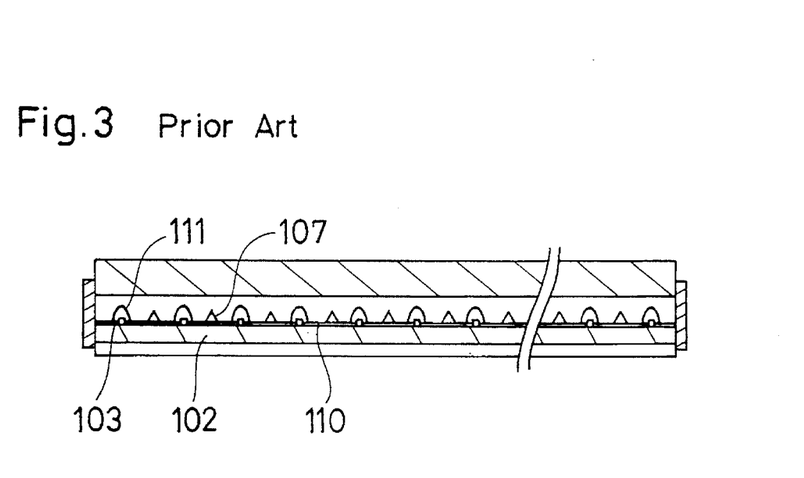
FIG. 3 is a front cross-sectional view showing a third conventional linear light source.

For example, a light source as shown in FIG. 3 was formed in a manner such that a reflecting coat 110 was applied onto the base plate 102, the light emitting diodes 103 were covered with a coating resin 111 and the reflecting plates 107 were arranged between the light emitting diodes 103. Although the illuminance improved as a whole, the illuminance was non-uniform along the length. The illuminance characteristic of the light source is shown by a broken line in FIG. 16. The numerals on the horizontal axis show the locations of the light emitting diodes 103. As shown in the figure, the illuminance decreases greatly in the spaces between the light emitting diodes 103 compared to where the light emitting diodes 103 are present. In addition, the highest illuminances at the places where the light emitting diodes 103 are present are slightly different from one another, and the ranges where the illuminance is high are not the same. The variation in illuminance at the places where the light emitting diodes 103 are present is attributed to the non-uniform configuration of the coating resin 111 covering the light emitting diodes 103.

SUMMARY OF THE INVENTION

An object of the present invention is to provide a linear light source where the interior is not damaged by dirt such as paper dust, where the warp of the base plate and the frame member is restrained, which has a high illuminance and a high uniformity of illuminance and which is easy to assemble.

A frame member formed by integrating a lens and reflecting frames has the bar lens at its upper part, has the reflecting frames at both ends, is open at its lower part and has an inverse-U-shaped cross section. In the inner surfaces of the reflecting frames, grooves are formed to face to each other. The base plate is inserted in the grooves. After the base plate is inserted, fixers are fitted at the both ends of the frame member to fix the base plate and close the both ends of the frame member. The generated heat is readily released from the under surface of the base plate to the outside, thereby restraining the increase in temperature of the base plate and the frame member. As a result, the warp of the base plate and the frame member due to thermal expansion is prevented. Since the frame member is formed by integrating the lens and the reflecting frames, the base plate held in the frame member is always located at a predetermined position. As a result, it is unnecessary to adjust the positions of the lens and the base plate relative to each other, thereby simplifying the assembling process. Since no dust such as paper dust intrudes into the frame member, the interior of the frame member is not damaged by dirt.

Electric parts such as resistors for limiting a current supplied to the light emitting diodes may be arranged on the upper surface of the base plate similarly to the light emitting diodes, or may be arranged on the under surface of the base plate oppositely to the light emitting diodes. If the electric parts are arranged on the under surface of the base plate, the light emitting diodes can be arranged with smaller spaces. As a result, the illuminance and the uniformity of illuminance are improved.

A linear light source having a great line length is achieved by linearly arranging a plurality of base plates in one long frame member. Terminals passing through the base plate are formed in the vicinity of an end of each base plate. The upper end of the terminal is connected to a conductive pattern formed on the base plate. The lower end of the terminal protrudes downward from the under surface of the base plate. After all the base plates are fitted in the frame member, the electrical connection between the base plates is made by inserting the lower parts of the terminals of the adjoining base plates into a connector. In the linear light source of this structure, it is unnecessary to arrange a plurality of pairs of conductive patterns in parallel on the base plate, and the width of the base plate is maintained small. Further, the assembly is easy.

The reflecting frames which form the sides of the frame member is made of a highly reflective material, and are inclined so that the width of the interior increases from the base plate toward the lens, whereby scattered light is more easily reflected toward the lens. A reflecting coat may be applied to the upper surface of the base plate to increase the quantity of the light irradiated onto the irradiated surface, and the light emitting diodes may be covered with a coating resin to direct the emitted light toward the lens. At this time, by providing around the light emitting diodes areas of a predetermined size where no reflecting coat is formed, the coating resin is formed into domes of a uniform configuration. Coating resin of the same configuration is also disposed between the light emitting diodes. With this structure, the uniformity of illuminance improves as well as the quantity of irradiated light increases.

Instead of the frame member which is open at its lower part along the length, a frame member may be used which has a bottomed reflecting frame. In this structure, the frame member is wide, the lens is arranged on one side of the width of the frame member, and an upper part of the frame member is formed along the lens. A partition which divides the interior of the frame member into two is provided to have its upper surface connected to one side of the lens and extends downward therefrom. The lower end of the partition is in contact with the base plate. At several positions of the upper part of the frame member and at positions of the bottom facing thereto, large openings are formed. On the inner side surfaces and the upper surface of the bottom of the grooves for inserting the base plate therein, protrusions are formed along the length. A wide base plate is used, and the light emitting diodes are arranged on one side of the width of the base plate so as to be located below the lens. On the upper surface of the base plate located below the upper part of the frame member, resistors are arranged. The base plate inserted in the frame member is fixed by fixers fitted in the both ends of the frame member.

The upper surface of the base plate is in contact with the under surface of the upper part of the groove at its both sides and in contact with the lower end of the partition at its center. The sides and the under surface of the base plate are in contact with the protrusions formed at the grooves to thereby prevent the base plate from moving. Since the generated heat is released from the openings formed at the upper part and the bottom of the frame member, the thermal expansion of the base plate is small. Since the base plate and the frame member are in contact in a small area, the thermal conduction to the frame member is reduced, and the base plate is easily inserted into the frame member. With this structure, a linear light source is also achieved where the interior is not damaged by dirt and where the base plate and the frame member do not warp.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 4:
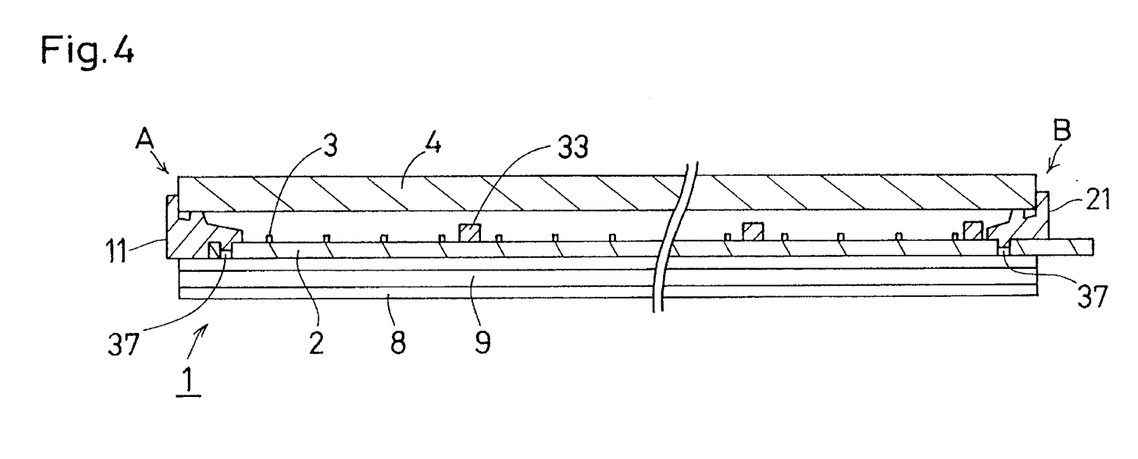
FIG. 4 is a front cross-sectional view showing a linear light source which is a first embodiment of the present invention.

Referring to FIG. 4, there is shown a linear light source which is a first embodiment of the present invention. A base plate 2 on which light emitting diodes 3 are placed is held in a long and narrow frame member 1.

The base plate 2 made of glass epoxy resin is a long and narrow plate with a thickness of approximately 0.8 mm, a width of 4 mm and a length of 328 mm. A plurality of light emitting diodes 3 are arranged on its upper surface. In the vicinity of each end of the base plate 2, a circular through hole 37 is formed for fixing the base plate 2 to the frame member 1 as described later.

Figure 5:
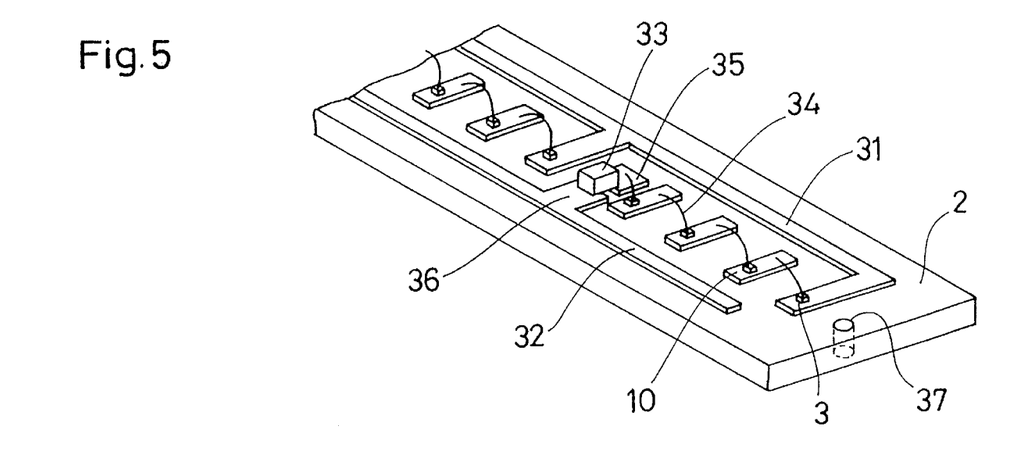
FIG. 5 is a perspective view showing an arrangement on a base plate of the first embodiment.

Referring to FIG. 5, there is schematically shown the arrangement of the light emitting diodes and conductive patterns on the base plate 2. On the upper surface of the base plate 2, a plurality of electrodes 10 made of copper layer are arranged with predetermined spaces. On both sides of the line of the electrodes 10, a first conductive pattern 31 and a second conductive pattern 32 made of copper layer are arranged for supplying power. The first conductive pattern 31 is connected to a predetermined number of electrodes 10.

Onto each of the electrodes 10, the light emitting diode 3 is fixed through a conductive adhesive. As the light emitting diode 3, a gallium phosphide semiconductor or a gallium arsenide phosphide semiconductor is used which is substantially of a cube with sides of 0.2 mm to 0.4 mm. The light emitting diodes 3 are equally spaced in a line along the length of the base plate 2 in the middle of the width of the base plate 2. In this embodiment, the light emitting diodes 3 are arranged with the spaces of approximately 10 mm. In the line of the light emitting diodes 3, resistors 33 for limiting the current supplied to the light emitting diodes 3 are inserted in the ratio of one resistor to a few light emitting diodes.

The light emitting diode 3 placed on the electrode 10 connected to the first conductive pattern 31 is connected to the next electrode 10 by a metallic fine wire 34. The light emitting diode 3 on this electrode 10 is connected to the further next electrode 10. The resistor 33 has one terminal connected to an electrode 35 and its other terminal to a protruding electrode 36 of the second conductive pattern 32. The last light emitting diode 3 connected in series is connected to the electrode 35 by the metallic fine wire 34. Thus, the predetermined number of light emitting diodes 3 and one resistor 33 are connected in series to form a group. A plurality of groups thus formed are connected in parallel since one end thereof are connected to the first conductive pattern 31 and the other end to the second conductive pattern 32.

The frame member 1 includes a lens 4 for condensing light emitted from the light emitting diodes 3, and reflecting frames 5 for holding the base plate 2 and for reflecting scattered light. The length of the frame member 1 is 324 mm which is slightly shorter than that of the base plate 2. The lens 4 is made of transparent polycarbonate resin. The reflecting frames 5 are made of polycarbonate resin containing titanium dioxide in order to increase the reflecting capability. The lens 4 and the reflecting frames 5 are integrated into the frame member 1 by extrusion molding.

Figure 6:
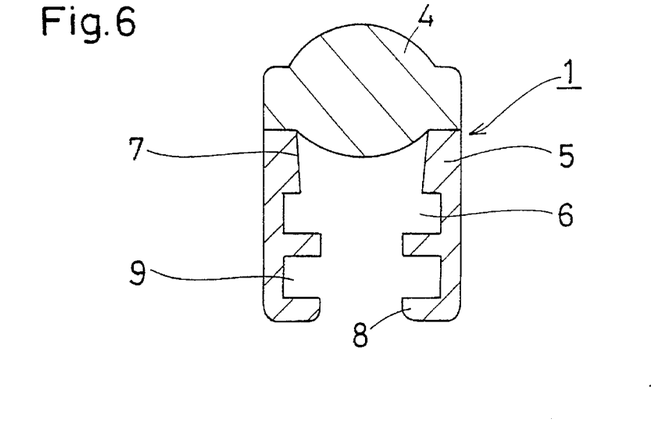
FIG. 6 is a cross-sectional view showing a frame member of the first embodiment.

Referring to FIG. 6, the frame member 1 has an inverse U shaped cross section. The lens 4 is provided with predetermined curvatures at its upper and under surfaces, respectively, and its thickness along the width is maximum at the center. Its thickness along the length is uniform. The lens 4 serves as a convex bar lens. The reflecting frames 5 are formed below the both sides of the lens 4 along the length of the lens 4 to be substantially perpendicular to the lens 4. The lower part of the frame member 1 is open along the entire length. In the inner surfaces of the reflecting frames 5, a pair of grooves 6 are formed along the length to be opposite to each other. The grooves 6 provided for inserting the base plate 2 therein are formed to be of a size such that the base plate 2 is substantially in close contact therewith. The inner surfaces of the reflecting frames 5 incline above the grooves 6 so that the width of the interior increases from the grooves 6 toward the lens 4. These inclining inner surfaces form reflecting surfaces 7 for reflecting scattered light. At the lower ends of the reflecting frames 5, protrusions 8 protruding inward are formed along the entire length.

The base plate 2 is inserted into the grooves 6 from one end of the frame member 1 and held therein. The light emitting diodes 3 are precisely arranged on the base plate 2 in order that the light emitting diodes 3 are located on the optical axis of the lens 4. Since the base plate 2 inserted in the grooves 6 is in contact with the inner surfaces of the grooves 6 at both sides of its upper surface, at both sides of its under surface and at its both side surfaces, the base plate 2 is completely prevented from moving vertically and along the width of the frame member 1. In the both ends of the frame member 1 holding the base plate 2 therein, fixers 11 and 21 are fitted to fix the base plate 2.

Figure 7:
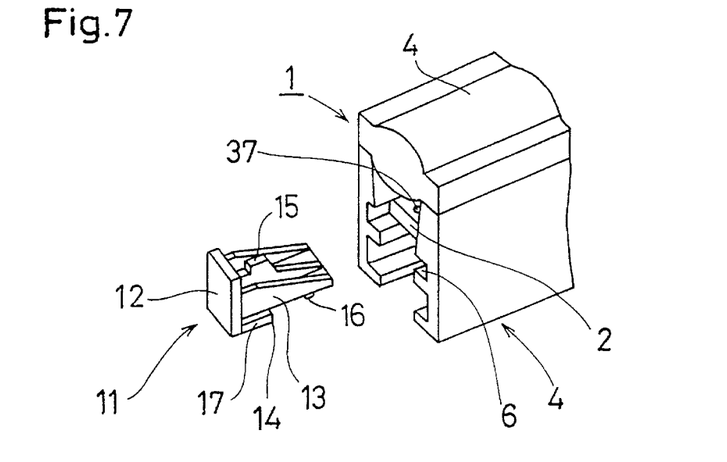
FIG. 7 is an exploded perspective view showing the vicinity of one end of the first embodiment.

Referring to FIG. 7, there is shown an exploded perspective view of a portion shown at A in FIG. 4. The fixer 11 made of polycarbonate resin includes a side wall 12, walls 13, a bottom 14, an extension 15, a projection 16 and protrusions 17. The walls 13 standing on the bottom 14 perpendicularly thereto are arranged to be parallel to one another. The side wall 12 is fixed to the bottom 14 and the walls 13 to be perpendicular thereto. The under surface of the bottom 14 is of a step form where the height of its one end coincides with the lower end of the side wall 12 and its other end is higher than the lower end by the thickness of the base plate 2. At a part of the bottom 14 which is in the vicinity of the side wall 12, the protrusions 17 are formed to protrude outward from the wall 13. At the upper end of each walls 13, an inclination gradually descending from the side wall 12 to the front end is provided in order to facilitate the fitting of the fixer 11 into the frame member 1. At the upper end of the central wall 13, the extension 15 having a horizontal upper surface is formed. On the bottom 14, the projection 16 which is cylindrical is formed to project downward in the vicinity of the front end of the under surface.

When the fixer 11 is fitted in the frame member 1, the under surface of the bottom 14 which is on the side of the side wall 12 abuts the upper surface of the lower part of the grooves 6, and the under surface of the front end of the bottom 14 abuts the base plate 2. The projection 16 engages with the through hole 37 of the base plate 2. The inner surface of the side wall 12 abuts the end surfaces of the reflecting frames 5 and the end surface of the lens 4, and the extension 15 abuts the under surface of the lens 4 located in the vicinity of the end surface of the frame member 1. The protrusion 17 of the bottom 14 abuts the side surfaces of the grooves 6. The fixer 11 is thus fitted in the space between the under surface of the lens 4 and the base plate 2 to fill the space, thereby closing the end of the frame member 1.

Figure 8:
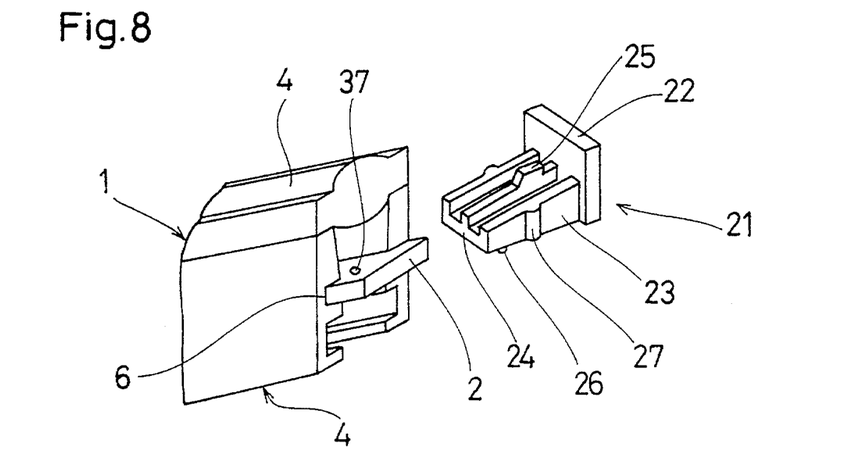
FIG. 8 is an exploded perspective view showing the vicinity of the other end of the first embodiment.

Referring to FIG. 8, there is shown an exploded perspective view of a portion shown at B in FIG. 4. The fixer 21 made of polycarbonate resin includes a side wall 22, walls 23, a bottom 24, an extension 25, a projection 26 and protrusions 27. The structure of the fixer 21 is substantially the same as that of the fixer 11 except that the under surface of the bottom 24 is provided with no step and is flat except the projection 26 and that the protrusions 27 are formed on the outer surface of each of the walls 23 located outside to extend from the upper to the lower ends thereof and to have the same inclination as that of the reflecting surfaces 7.

When the fixer 21 is fitted in the frame member 1, the under surface of the bottom 24 abuts the base plate 2, and the projection 26 engages with the through hole 37 of the base plate 2. The inner surface of the side wall 22 abuts the end surfaces of the reflecting frames 5 and the end surface of the lens 4, and the extension 25 abuts the under surface of the lens 4 which is located in the vicinity of the end surface of the frame member 1. The protrusions 27 abut the reflecting surfaces 7. The fixer 21 is thus fitted in the space between the under surface of the lens 4 and the base plate 2 to close the end of the frame member 1. At this time, the end of the base plate 2 protrudes from the frame member 1 in order to enable the connection of the power source to the conductive patterns 31 and 32. Thus, the base plate 2 is held in the frame member 1.

Light emitted from the light emitting diode 3 is condensed by the lens 4 which is a convex bar lens to linearly irradiate the light irradiated surface. Since the reflecting surfaces 7 of the reflecting frames 5 incline so that the width of the interior increases toward the top as described previously and the scattered light is reflected by the reflecting surfaces 7 toward the lens 4, the reduction in irradiated light due to scattering is restrained. Although the resistors 33 are inserted in the line of the light emitting diodes 3, since the light emitting diodes 3 are equally spaced, the irradiation is performed substantially uniformly.

In the linear light source of this embodiment, the intrusion of dust such as paper dust into the space between the base plate 2 and the lens 4 never occurs, since the lens 4 and the reflecting frames 5 are integrated and the both ends of the frame member 1 holding the base plate 2 therein are closed by the fixers 11 and 12. It is normally difficult to clean the interior of the light source at the time of maintenance. In the linear light source of this embodiment, however, since the under surface of the lens 4, the surfaces of the light emitting diodes 3, the surface of the base plate 2 and the reflecting surface 7 are never damaged by dirt, there is no need of cleaning. Therefore, the reduction in light quantity and non-uniform distribution of irradiation due to the accumulation of damages by dirt never occur even when the light source is used for a long time. Thus, the deterioration of the performance is prevented.

The base plate 2 is in contact with the grooves 6 of the reflecting frames 5 at the both sides of its upper and under surfaces, so that the base plate 2 does not vertically move along the entire length. Since the reflecting frames 5 and the lens 4 are integrated, the distance between the base plate 2 and the lens 4 are uniform. For this reason, the distance from the light emitting diodes 3 to the lens 4 is uniform irrespective of the locations of the light emitting diodes 3. Therefore, the light condensed by the lens 4 forms on the light irradiated surface a uniform image with a uniform line width and a uniform illuminance.

Heat is generated when the light emitting diodes 3 are turned on. The heat is, however, efficiently released from the under surface of the base plate 2 since the lower part of the frame member 1 is widely open. With this structure, the increase in temperature of the base plate 2 is restrained, and the thermal expansion of the base plate 2 is reduced. As a result, the warp of the base plate 2 along the length is prevented. Since the base plate 2 and the frame member 1 are in contact in a small area, the thermal conduction from the base plate 2 to the frame member 1 is reduced. As a result, the warp of the frame member 1 due to thermal expansion is prevented.

Since the lower part of the frame member 1 is open whereas the thick lens 4 is arranged at its upper part, the frame member 1 appears liable to deformation by external force. However, at the both lower ends of the frame member 1, the protrusions 8 protruding inward are formed along the entire length in order to increase the strength. In the linear light source of the above-described structure, the frame member 1 is sufficiently strong against deformation since the expansional deformation of the base plate 2 and the expansional deformation of the frame member 1 are sufficiently restrained by the efficient release of heat. Therefore, the warp of the frame member 1 along the length is prevented, so that the distance between the light source and the light irradiated surface is uniform. As a result, irradiation is performed with a uniform line width and a uniform illuminance.

As described previously, in the assembling process, the base plate 2 is inserted into the grooves 6 from one end of the frame member 1. Although the base plate 2 is in contact with the grooves 6 at both sides of its upper and under surfaces and at its both side surfaces, most of the under surface of the base plate 2 is out of contact with the frame member 1. Since the frictional resistance is low for this reason, the base plate 2 is smoothly inserted into the grooves 6. In addition, in the linear light source of this embodiment, since the opening along the entire length of the lower part of the frame member 1 provides the reflecting frames 5 with a resiliency, the reflecting frames 5 slightly open outward when the base plate 2 is inserted therein. As a result, the base plate 2 is more smoothly inserted into the grooves 6. Further, since the base plate 2 is always held at a predetermined position relative to the lens 4 by being inserted in the grooves 6, it is unnecessary to adjust the positions of the lens 4 and the base plate 2 relative to each other. As a result, the assembling process is simplified.

While the resistors 33 are used in this embodiment, in stead of or in addition to the resistors 33, other electric parts such as chip capacitors for voltage smoothing may be used. Moreover, the light emitting diodes 3 may be connected in parallel without using any electric part such as a resistor.

While a pair of grooves 6 are formed inside the reflecting frames 5 as described previously, the upper parts of the protrusions 8 provided at the both lower ends of the frame member 1 may be used as second grooves 9 for holding the base plate 2. In this case, the grooves 9 are formed to have the same height and width as those of the first grooves 6. When the base plate 2 is inserted in the second grooves 9, the distance between the light emitting diodes 3 and the lens 4 is long compared to the case where the plate 2 is inserted in the first grooves 6. As a result, the width of irradiation is altered. When used as a light source for an electrographic copying machine, if the base plate 2 is inserted in one pair of grooves, the light source will work as a narrow line width light source suitable for original irradiation, and if the base plate 2 is inserted in the other pair of grooves, the light source will work as a wide line width light source suitable for charge removal. Thus, the linear light source of this embodiment has wide range of application since it serves as two types of light sources having different line widths, respectively.

Figure 9:
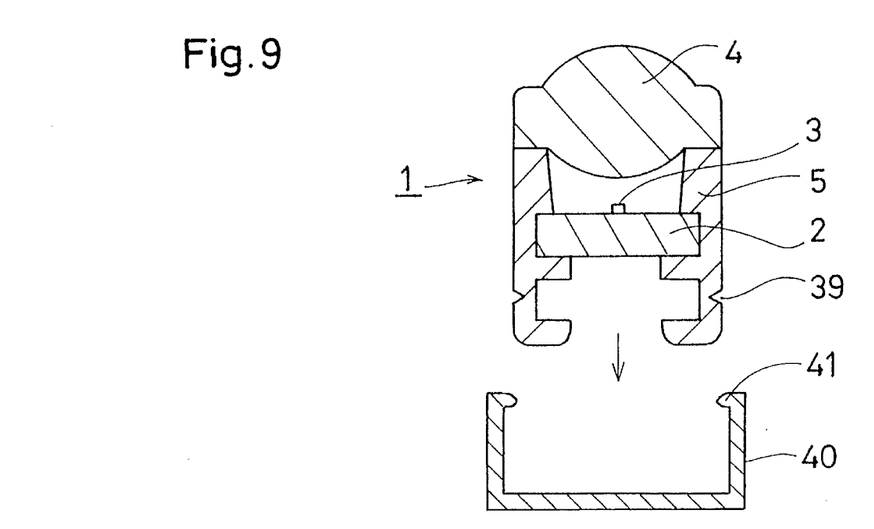
FIG. 9 is an exploded cross-sectional view showing how the first embodiment is attached to a holder.

To attach the above-described linear light source to an electrographic copying machine, a holder 40 as shown in FIG. 9 may be used. The holder 40 made of a metal or a plastic has a U-shaped cross section and is substantially as long as the frame member 1. At the upper end of each side wall, a protrusion 41 protruding inward is formed along the length. In the lower part of the outer surface of each reflecting frame 5, a groove 39 with which the protrusion 41 engages is formed along the length. To attach the frame member 1 to the holder 40, the frame member 1 is pushed down toward the holder 40 as shown by the arrow of FIG. 9. The frame member 1 is smoothly inserted into the holder 40 since the reflecting frames 5 bend inward because of the opening at the lower part of the frame member 1. When the base plate 2 is inserted in the lower second grooves 9, the frame member 1 is smoothly inserted if a resiliency is provided to the holder 40. The holder 40 serves not only as a linear light source holder but also as a heat releasing plate for the frame member 1. The protrusions 41 of the holder 40 and the grooves 39 may be formed along the entire length or may be discontinuously formed at several positions along the length.

Figure 10:
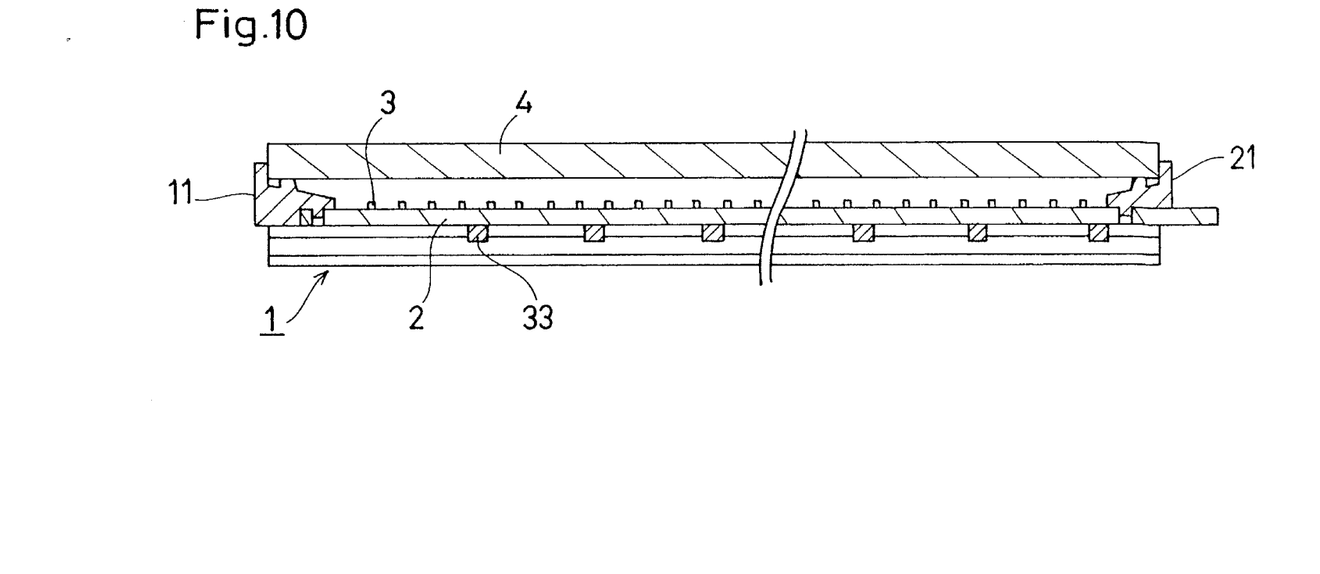
FIG. 10 is a front cross-sectional view of a linear light source which is a second embodiment of the present invention.

Referring to FIG. 10, there is shown a linear light source which is a second embodiment of the present invention. While the light emitting diodes 3 and the resistors 33 are arranged on the same surface of the base plate 2 in the first embodiment, in this embodiment, the light emitting diodes 3 are arranged on the upper surface of the base plate 2 and the resistors 33 are arranged on the under surface of the base plate 2. The frame member 1 and the fixers 11 and 21 of this embodiment will not be described herein since they have the same structures as those of the first embodiment.

The base plate 2 made of glass epoxy resin is a long and narrow plate with a thickness of approximately 0.8 mm, a width of 4 mm and a length of 328 mm. On its upper surface, a plurality of electrodes 10 made of copper layer are arranged along the length with predetermined spaces. On both sides of the line of the electrodes 10, the first conductive pattern 31 and the second conductive pattern 32 made of copper layer are arranged for supplying power. The first conductive pattern 31 is connected to a few predetermined electrodes 10.

Onto each of the electrodes 10, the light emitting diode 3 is fixed through a conductive adhesive. As the light emitting diode 3, a gallium phosphide semiconductor or a gallium arsenide phosphide semiconductor is used which is substantially of a cube with sides of 0.2 mm to 0.4 mm. The light emitting diodes 3 are equally spaced in a line along the length of the base plate 2 in the middle of the width of the base plate 2. In this embodiment, the light emitting diodes 3 are arranged with the spaces of approximately 5 mm.

Figure 11:
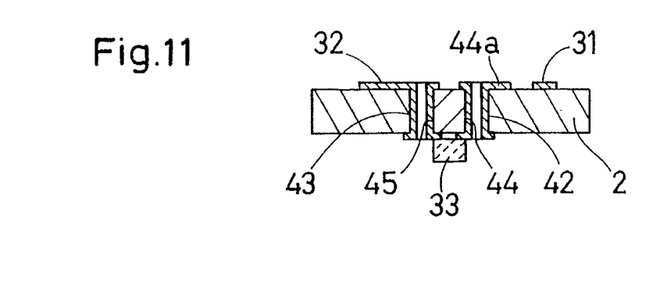
FIG. 11 is a cross-sectional view showing the vicinity of a resistor in the second embodiment.

On the under surface of the base plate 2, resistors 33 for limiting the current supplied to the light emitting diodes 3 are arranged in the ratio of one resistor to a few light emitting diodes. A portion of the base plate in the vicinity of the resistor 33 is shown in FIG. 11. In the base plate 2, two small-diameter through holes 42 and 43 are formed. In the vicinity of the through holes 42 and 43, through hole members 44 and 45 are formed. The through hole member 44 has its lower end connected to one terminal of the resistor 33 and its upper end connected to an electrode 44a. The through hole member 45 has its lower end connected to the other terminal of the resistor 33 and its upper end connected to the second conductive pattern 32. The through holes 42 and 43 may be closed after the through hole members 44 and 45 are formed.

The light emitting diode 3 placed on the electrode 10 connected to the first conductive pattern 31 is connected to the next electrode 10 by the metallic fine wire 34. The light emitting diode 3 on this electrode 10 is connected to the further next electrode 10 (see FIG. 5). The last light emitting diodes 3 of a group of light emitting diodes thus connected is connected to the resistor 33 by being connected to the electrode 44a (FIG. 11). Thus, the predetermined number of light emitting diodes 3 and one resistor 33 are connected in series to form a group. A plurality of groups thus formed are connected in parallel since one end thereof are connected to the first conductive pattern 31 and the other end to the second conductive pattern 32.

The base plate 2 having the light emitting diodes 3 arranged on its upper surface and the resistors 33 arranged on its under surface is fitted in the frame member 1 and fixed by the fixers 11 and 12.

The linear light source of this structure is provided with all the functions and characteristics of the linear light source of the first embodiment. In addition thereto, since the light emitting diodes 3 are arranged with the spaces half the spaces of the first embodiment, the number of light emitting diodes 3 is doubled. As a result, the quantity of light is doubled. Further, since the light emitting diodes 3 are arranged with smaller spaces, the reduction in illuminance between the light emitting diodes 3 is remarkably decreased. Thus, a linear light source with a high illuminance and a high uniformity is realized.

While the first and second conductive patterns 31 and 32 are formed on the upper surface of the base plate 2 where the light emitting diodes 3 are arranged in this embodiment, the second conductive pattern 32 may be formed on the under surface of the base plate 2 where the resistors 33 are arranged. In this case, it is unnecessary to form the through hole 43 for connecting the resistor 33 and the second conductive pattern 32. Further, the size of the light source can be reduced since it is possible to by decrease the width of the base plate 2.

Figure 12:
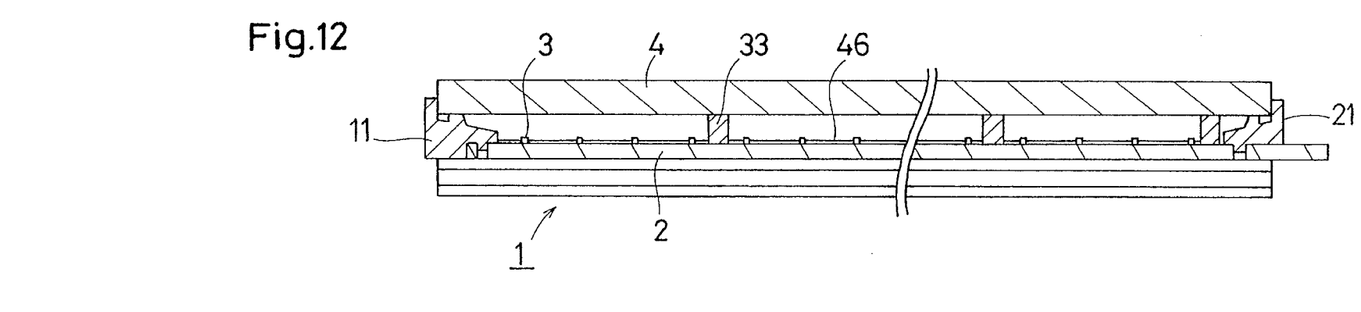
FIG. 12 is a front cross-sectional view of a linear light source which is a third embodiment of the present invention.

Referring to FIG. 12, there is shown a linear light source which is a third embodiment of the present invention. In this embodiment, the frame member 1 is used which is made of the same material and formed in the same manner as the first and second embodiments. The configuration of the frame member 1 is different from that of the first and second embodiments only in that the height of the grooves 6 formed inside the reflecting frame 5 is greater than the thickness of the base plate 2.

On the base plate 2, the light emitting diodes 3 and the resistors 33 are arranged like in the first embodiment. However, the height of the resistors 33 of this embodiment is greater than that of the resistor 33 of the first embodiment. In this embodiment, the formation of the electrodes 10 and the conductive patterns 31 and 32, the arrangement of the light emitting diodes 3, and the connection between the light emitting diodes 3 and between the light emitting diode 3 and the resistor 33 are the same as those of the first embodiment as shown in FIG. 5. The base plate 2 is fixed by fitting the previously-described fixers 11 and 21 in the both ends of the frame member 1. Under this condition, the upper surfaces of the resistors 33 are in contact with the under surface of the lens 4.

With this structure, since there is a gap between the upper surface of the base plate 2 and an under surface 46 of the upper part of each groove 6, the frictional force between the base plate 2 and the grooves 6 is further reduced. As a result, the base plate 2 is more smoothly inserted into the grooves 6. In the insertion, the resistors 33 and the under surface of the lens 4 are in contact. However, this is no obstacle since the central portion of the base plate 2 along the width bends downward.

Figure 13:
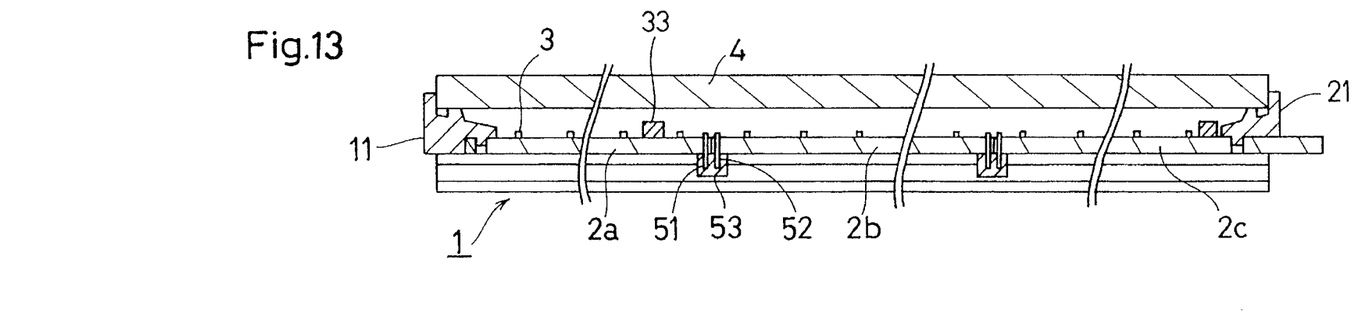
FIG. 13 is a front cross-sectional view of a linear light source which is a fourth embodiment of the present invention.

Referring to FIG. 13, there is shown a cross section of a linear light source which is a fourth embodiment. The frame member 1 has the same structure as that of the first embodiment except that its length is 972 mm. The frame member 1 holds therein three base plates 2a, 2b and 2c in this order in a line.

The base plates 2a, 2b and 2c have a thickness of approximately 0.8 mm, a width of 4 mm and a length of 325 mm. The arrangement of the electrodes 10, the first and second conductive patterns 31 and 32 and the resistors 33, and the wiring by the metallic fine wire 34 are substantially the same as those of the first embodiment shown in FIG. 5. Therefore, they will not be described with respect to this embodiment. In the vicinity of the base plate 2b side end of the base plate 2a, a terminal 51 soldered to the first conductive pattern 31 is provided to pass through the base plate 2a. Likewise, in the vicinity of the base plate 2a side end of the base plate 2b, a terminal 52 soldered to the first conductive pattern 31 is provided to pass through the base plate 2b. The lower parts of the terminals 51 and 52 protrude from the lower surfaces of the base plates 2a and 2b, and are electrically connected to each other by being inserted in a connector 53. The first conductive patterns 31 of the base plates 2a and 2b are connected to each other in this manner. The second conductive patterns 32 are connected in a similar manner. With respect to the base plates 2b and 2c, the first conductive patterns 31 and the second conductive patterns 32 are connected in a similar manner. The connection of the conductive patterns is made by attaching the connector 53 after the base plates 2a, 2b and 2c are fitted in the frame member 1. The base plate 2a is fixed to the frame member 1 by the fixer 11 shown in the first embodiment. The base plate 2c is fixed to the frame member 1 by the fixer 21.

With this structure, a linear light source with a very long irradiation line length is provided. The formation of the electrodes 10 and the conductive patterns 31 and 32, and the arrangement and connection of the light emitting diodes 3 and the resistors 33 on the base plates 2a, 2b and 2c may be performed separately with respect to each base plate. As the necessary equipments such as the bonder, conventional ones may be used. The separately prepared base plates 2a, 2b and 2c are connected to each other by the connector 53 after they are fitted in the frame member 1. Thus, the assembly of this light source is very simple and easy. Since the frame member 1 is open at its lower part, the connecters 53 are attached easily. Moreover, the terminals 51 and 52 and the connectors 53 do not protrude out of the frame member 1. Since the base plates 2a, 2b and 2c are in contact with the frame member 1 in small areas and the frictional force therebetween is therefore small, the base plates are smoothly inserted into the frame member 1. Further, although the irradiation line length of the linear light source of this embodiment is very long, it is unnecessary to arrange a plurality of pairs of conductive patterns in parallel on the base plate. As a result, the width of the base plate is small.

Since the base plates 2a, 2b and 2c are in contact with the frame member 1 at their upper and under surfaces, the distance between the light emitting diodes 3 and the lens 4 are uniform and light is uniformly condensed by the lens 4. Further, since the lower part of the frame member 1 is open along the entire length, heat is efficiently released, so that the base plates 2a, 2b and 2c and the frame member 1 do not readily warp. As a result, the distance between the light source and the light irradiated surface is uniform. Since a very long image with a uniform line width and a uniform illuminance is formed on the light irradiated surface, this light source is advantageous for use in a copying machine for copying of sheets of A2 size or larger.

While the light emitting diodes 3 and the resistors 33 are arranged on the upper surfaces of the base plates 2a, 2b and 2c in this embodiment, the resistors 33 may be arranged on the under surfaces of the base plates 2a, 2b and 2c as shown in the second embodiment. With this structure, the light emitting diodes 3 can be arranged with smaller spaces. As a result, the illuminance and uniformity are further improved.

Figure 14:
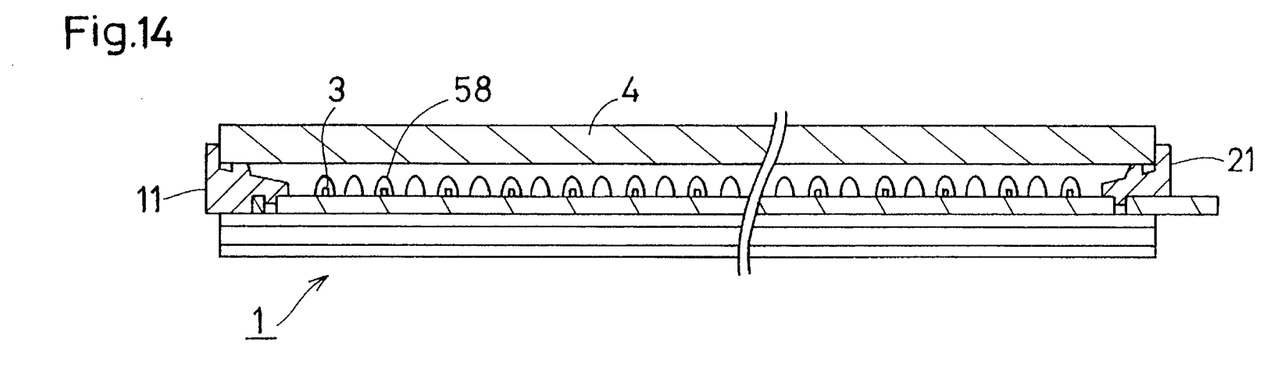
FIG. 14 is a front cross-sectional view of a linear light source which is a fifth embodiment of the present invention.
Figure 15:
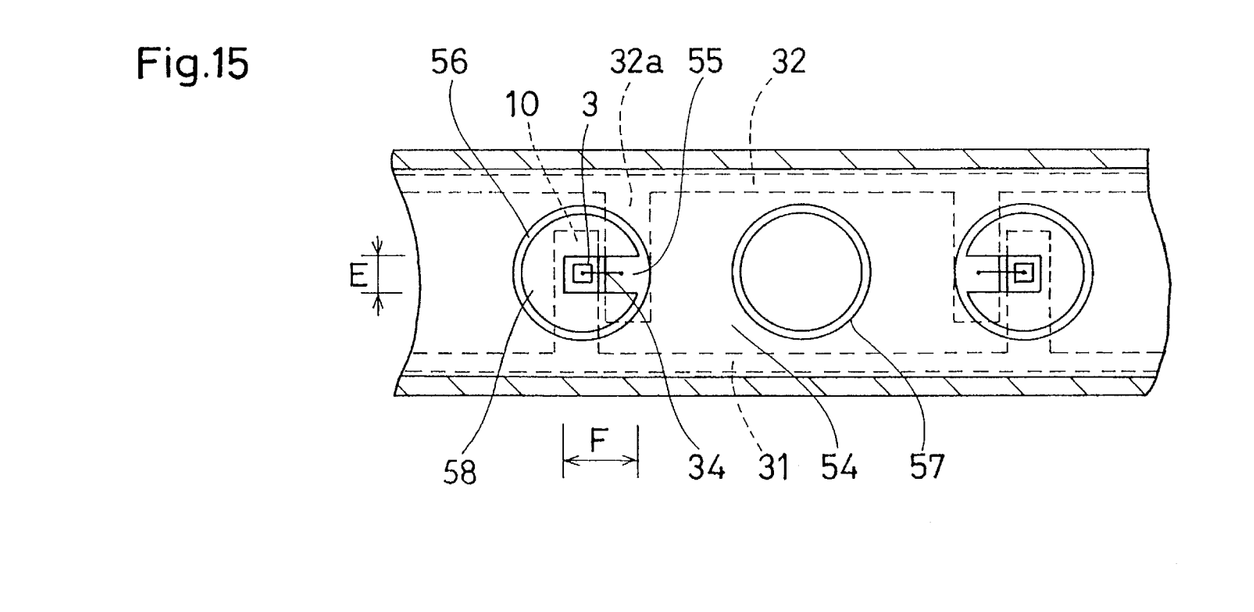
FIG. 15 is a plan view showing the upper surface of the base plate in the vicinity of the light emitting diodes.

FIG. 14 shows a cross section of a linear light source which is a fifth embodiment of the present invention. FIG. 15 shows an enlarged plan view of the light source. The base plate 2 is made of glass epoxy resin and has a thickness of approximately 0.8 mm, a width of 4 mm and a length of 328 mm. On its upper surface, a plurality of electrodes 10 made of copper layer are arranged along the length with predetermined spaces. On both sides of the line of the electrodes 10, the first conductive pattern 31 and the second conductive pattern 32 made of copper layer are arranged for supplying power. Onto each of the electrodes 10, the light emitting diode 3 is fixed through a conductive adhesive. As the light emitting diode 3, a gallium phosphide semiconductor or a gallium arsenide phosphide semiconductor is used which is substantially of a cube with sides of 0.2 mm to 0.4 mm. The light emitting diodes 3 are equally spaced in a line along the length of the base plate 2 in the middle of the width of the base plate 2. In this embodiment, the light emitting diodes 3 are arranged with the spaces of approximately 10 mm.

The electrodes 10 are formed to be connected to the first conductive pattern 31. The second conductive pattern 32 is provided with comb tooth shaped protrusions 32a close to the electrodes 10. The light emitting diodes 3 are connected to the protrusions 32a of the second conductive pattern 32 by the metallic fine wire 34, so that all the light emitting diodes 3 are connected in parallel.

Substantially the entire upper surface of the base plate 2 except a predetermined portion is covered with a reflecting coat 54 for reflecting scattered light. The reflecting coat 54 is formed after the electrodes 10 and the first and second conductive patterns 31 and 32 are made and before the light emitting diodes 3 are fixed onto the electrodes 10. Therefore, to secure electrical connection, no reflecting coat 54 is formed on a portion of each electrode 10 on which the light emitting diode 3 is placed and a portion of each protrusion 32a of the second conductive pattern 32 to which the light emitting diode 3 is wired. Specifically, in FIG. 15, no reflecting coat 54 is formed on a substantially rectangular area 55 with a width E of 1.2 mm and a length F of 1.9 mm. Moreover, for a reason mentioned later, no reflecting coat 54 is applied to a substantially circumferential area 56 located outside a 1.2 mm radius circle with the light emitting diode as a center and inside a 1.4 mm radius concentric circle. Thus, in the vicinity of the light emitting diode 3, no reflecting coat 54 is applied to the circumferential belt area 56 with a width of 0.2 mm and the inwardly extending rectangular area 55 connecting with the area 56. At the midpoint between the light emitting diodes 3, no reflecting coat 54 is applied to a belt area 57 with a width of 0.2 mm located outside a 1.2 mm radius circle and inside a 1.4 mm radius concentric circle. Except the areas 55, 56 and 57, the entire upper surface of the base plate 2 is covered with the reflecting coat 54.

As the reflecting coat 54, a light reflecting white coat is used. To form the reflecting coat 54, a mesh masking material made of Tetron or a metal having its predetermined part filled is arranged on the base plate 2, and a white coat is applied with a brush. Although epoxy resin containing titanium dioxide may be used for the reflecting coat 54, the reflecting coat 54 is more easily made if a light reflecting coat is used.

The light emitting diodes 3 placed on the base plate 2 are covered with a coating resin 58 made of a transparent silicon resin. The coating resin 58 is formed to have a domed top. To apply the coating resin 58, an automatic potter is used. The automatic potter includes a syringe having a needle and connected to the body by a tube. The liquid enclosed in the syringe is discharged by a predetermined quantity through the needle by the pressurization by the body. The syringe which is movable is controlled so that a predetermined quantity of liquid is discharged in a predetermined period of time at a predetermined position. In this embodiment, the light emitting diodes 3 are covered with a coating resin of a predetermined quantity of 0.002 $cm^3$ to 0.004 $cm^3$.

Since the refractive index of the crystal constituting the light emitting diode 3 and that of the coating resin 58 are not largely different from each other, the quantity of available light increases by covering the light emitting diodes 3 with the coating resin 58. Moreover, since the domed coating resin 58 directs light toward the lens 4, the illuminance improves.

The fluidity of the coating resin 58 is lower on the base plate 2 and on the electrodes 10 than on the reflecting coat 54. The substantially circumferential belt area 56 provided around the light emitting diode 3 as described previously is hollow and forms a groove since no reflecting coat 54 is formed thereon. Therefore, the coating resin 58 applied to the light emitting diode 3 stops flowing and sets at the circumferential belt area 56. As a result, the coating resin 58 is formed into a dome with a circular bottom. Since the size of the circumferential belt area 56 is the same with respect to every light emitting diode 3, the coating resins 58 covering the light emitting diodes 3 are of the same configuration and there is no non-uniformity in the configuration. As mentioned previously, at the midpoint between the light emitting diodes 3, there is an area where no reflecting coat 54 is applied. In this area, the coating resin 58 is formed to have a domed top. In this case, the quantity of coating resin is the same as that of the above-described case. Since the volume of the light emitting diode 3 is only approximately 1% of the volume of the coating resin used, the coating resin 58 is formed to be of substantially the same height and configuration although no light emitting diode 3 is present therein.

The base plate 2 thus structured is fitted in the frame member 1. Since the frame member 1 is the same as those of the first and second embodiments, no description thereof will be given. The base plate 2 fitted in the frame member 1 is fixed by the previously-described fixers 11 and 12 at its both ends.

In the above-described linear light source, light emitted from the light emitting diodes 3 is condensed by the lens 4 and linearly irradiates the light irradiated surface. Since the domed coating resin 58 applied to the light emitting diodes 3 functions as a convex lens, more of the light emitted from the light emitting diodes 3 is directed to the lens 4. Since scattered light is reflected and directed toward the lens 4 by the reflecting coat 54 on the base plate 2 and by the inclining reflecting surfaces 7 of the reflecting frames 5, more of the scatter light is used for the irradiation. For this reason, the illuminance is high compared to a linear light source in which only the same number of the same light emitting diodes 3 are arranged. Further, since the domed coating resin 58 between the light emitting diodes 3 serves as a lens, the fall of the illuminance between the light emitting diodes 3 is reduced. Thus, a linear light source with a high illuminance and a high uniformity of illuminance is realized.

Figure 16:
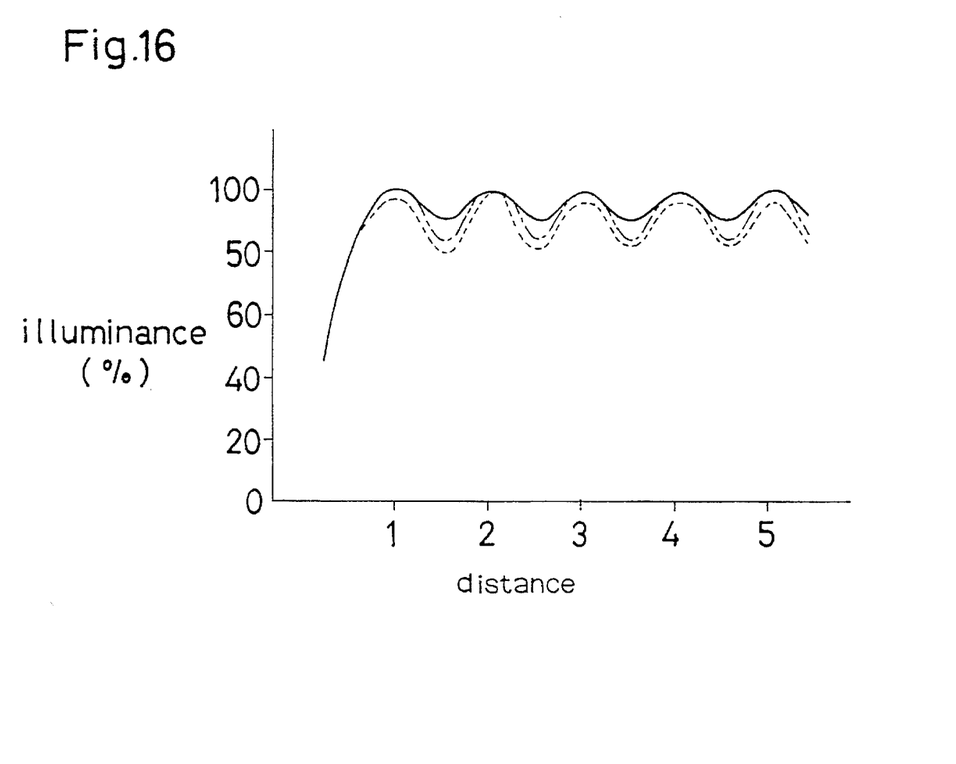
FIG. 16 graphically shows the illuminance characteristics of the fifth embodiment and conventional linear light sources.

Referring to FIG. 16, there are shown illuminance characteristics this embodiment and conventional linear light sources. In this figure, the abscissa represents the length of the base plate 2, and the numerals on the horizontal axis show the locations of the light emitting diodes 3. The ordinate represents relative values of illuminance when the maximum illuminance is 100%. The solid line shows the illuminance characteristic of the linear light source of this embodiment. The alternate long and dash line shows the characteristic of a linear light source in which no coating resin is applied between the light emitting diodes. The broken line shows the characteristic of the conventional light source of FIG. 3. In this conventional light source, the illuminances of the places where the light emitting diodes are arranged are non-uniform since the configurations of the coating resins are non-uniform. On the contrary, in the light source of this embodiment, the illuminance of the places where the light emitting diodes are arranged is uniform. Further, in the conventional light source, the illuminance falls between the light emitting diodes by nearly 20% from the illuminance of the places where the light emitting diodes are arranged, whereas in this embodiment, the fall is reduced to 10% or smaller. In the light source where no coating resin is applied between the light emitting diodes, the fall of the illuminance is slightly reduced compared to the conventional light source.

Like the previously-described first to fourth embodiments, this embodiment has the characteristics that dust such as paper dust never intrudes between the base plate 2 and the lens 4, that heat is efficiently released since the frame member 1 is open at its lower part and that the warp of the base plate 2 and the frame member 1 is restrained. Particularly, the integration of the lens 4 and the reflecting frames 5 and the employment of the fixers 11 and 21 for closing the both ends of the frame member 1 prevent damages by dirt inside the light source. As a result, the quantity of irradiated light increased by the reflecting coat 54 and the coating resin 58 is maintained for a long time.

Figure 17:
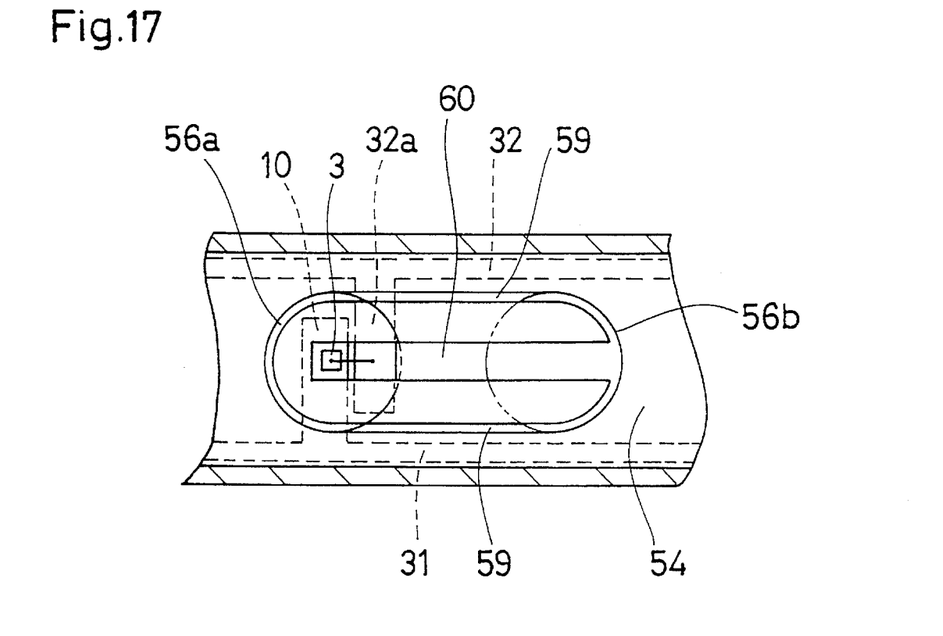
FIG. 17 is a plan view showing the upper surface of the base plate in the vicinity of the light emitting diodes, according to a sixth embodiment of the invention.

Referring to FIG. 17, there is shown an enlarged plan view of a sixth embodiment of the present invention. In this embodiment, to further improve the illuminance and the uniformity of illuminance of the linear light source of the fifth embodiment, the light emitting diodes 3 are arranged with smaller spaces, and the coating resin 58 covering the light emitting diodes 3 and the coating resin placed between the light emitting diodes 3 are integrated. In this embodiment, the light emitting diodes 3 are arranged with the spaces of approximately 6 mm. The areas 55 and 56 of the fifth embodiment located around the light emitting diodes 3 and having no reflecting coat 54 applied thereto are extended along the length of the base plate 2. Specifically, the area having no reflecting coat 54 applied thereto includes two semicircumferential belt areas 56a and 56b with a width of 0.2 mm, two linear belt areas 59 with a width of 0.2 mm connecting the areas 56a and 56b, and a substantially rectangular area 60 including the portion of the electrode on which the light emitting diode is placed. The area 60 is formed to extend from the semicircumferential belt area 56b which is farther from the light emitting diode. The reflecting coat 54 is formed in a similar manner to the fifth embodiment.

The coating resin 58 is formed in a manner substantially similar to the fifth embodiment. However, several times of quantity of coating resin is discharged while the syringe of the automatic potter is moved at a predetermined speed from the upper surface of the light emitting diode 3 along the length of the base plate 2. In this case, the configuration of the coating resin 58 is uniform since an area having no reflecting coat 54 thereon is provided therearound.

Other structures are the same as those of the fifth embodiment. With this structure, since the coating resin 58 functions as a bar lens and light emitted from the light emitting diodes 3 is directed not only to the lens 4 but also along the length of the base plate 2, the uniformity of illuminance is further improved. In addition, since more number of light emitting diodes 3 are arranged because of the smaller spaces between the light emitting diodes 3, the illuminance is further improved. If a silicon resin containing titanium dioxide is used as the coating resin 58, the uniformity of illuminance will be further improved because of a scattering action.

Figure 18:
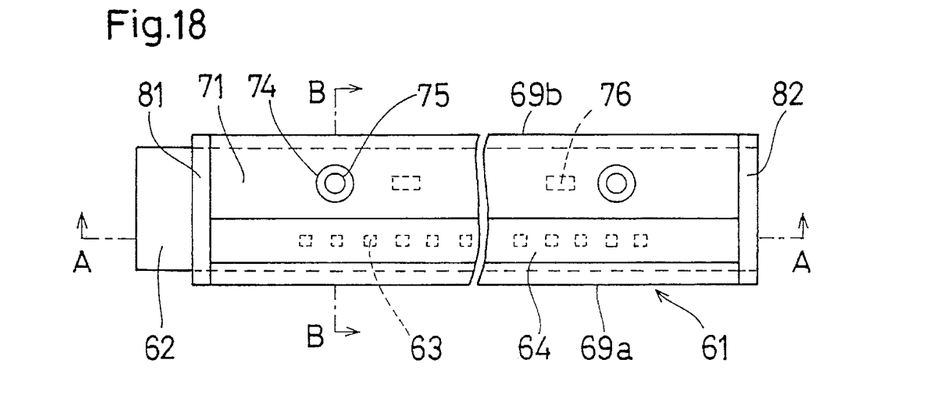
FIG. 18 is a plan view of a linear light source which is a seventh embodiment of the present invention.
Figure 19:
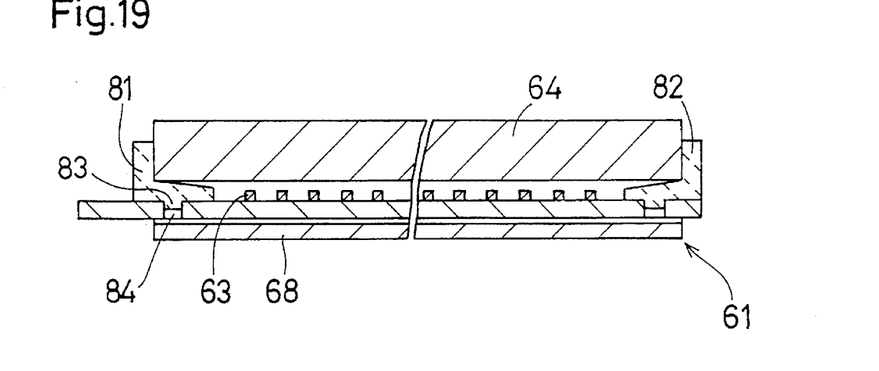
FIG. 19 is a front cross-sectional view of the seventh embodiment.
Figure 20:
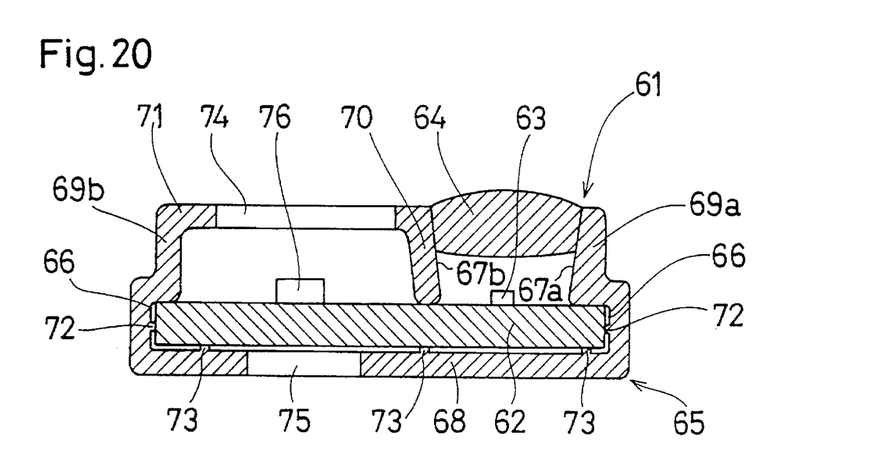
FIG. 20 is a side cross-sectional view of the seventh embodiment.

FIG. 18 shows a linear light source which is a seventh embodiment of the present invention. FIGS. 19 and 20 show cross sections of FIG. 18 taken on lines A—A and B—B, respectively. In these figures, a frame member 61 is constituted by a lens 64 and reflecting frames 65 integrated by extrusion molding, and has a length of 324 mm.

At the upper part of the frame member 61, the lens 64 with a width of ⅓ to ½ the width of the frame member 61 is formed along the length of the frame member 61. The lens 64 is made of transparent polycarbonate resin, and its upper and under surfaces are convex lenses each having a predetermined curvature. The reflecting frames 65 made of polycarbonate resin containing titanium dioxide includes a plane bottom 68, sides 69a and 69b formed substantially perpendicular to the bottom 68 along the length of the frame member 61, and a partition 70. The partition 70 and the side 69b are connected to each other by an upper part 71 parallel to the bottom 68. The lens 64 is held by the side 69a and the partition 70 at its both sides along the length. The inner surface of the side 69a and the lens side surface of the partition 70 face to each other and constitute reflecting surfaces 67a and 67b. The reflecting surfaces 67a and 67b are inclined so that the width of the interior increases toward the lens 64.

The sides 69a and 69b of the reflecting frame 65 are bent inside once in the middle between the bottom and the top. The under surfaces of the bent portions of sides 69a and 69b are coplanar with the lower end of the partition 70, as shown in FIG. 20. The bending of the sides 69a and 69b form a pair of grooves 66 inside the frame member 61 along the length. On the inner side surface of each of the sides 69a and 69b facing to the groove 66, a protrusion 72 is formed. On the upper surface of the bottom 68, three protrusions 73 are provided in the vicinity of the sides 69a and 69b and below the partition 70. The protrusions 72 and 73 are continuously formed along the entire length of the frame member 61. Its cross section is a semicircle with a radius of, for example, 0.1 mm. In the upper part 71 of the frame member 61, through holes 74 having a diameter slightly smaller than the width of the upper part 71 are formed at several positions. In the bottom 68 facing to the upper part 71, through holes 75 having a diameter approximately half the diameter of the through hole 74 are formed at several positions.

A base plate 62 is made of glass epoxy resin, and has a thickness of 1 mm, a width of 9 mm and a length of 328 mm. On the upper surface of the base plate 62, light emitting diodes 63 are arranged on the optical axis of the lens 64. As the light emitting diode 63, a gallium phosphide semiconductor or a gallium arsenide phosphide semiconductor is used which is substantially of a cube with sides of 0.2 mm to 0.4 mm. In this embodiment, the light emitting diodes 3 are arranged with the spaces of 5 mm. On the upper surface of the base plate 62, resistors 76 for limiting the current supplied to the light emitting diodes 63 are linearly arranged parallel to the line of the light emitting diodes 63 so as to be located below the upper part 71 of the frame member 61. A plurality of the light emitting diodes 63 and one resistor 76 are connected in series by a known circuit connecting method to form a group. The groups thus formed are connected in parallel.

The base plate 62 is inserted in the grooves 66 of the frame member 61, and is held in the frame member 61 by being in contact with the upper surfaces of the grooves 66 at the both sides of its upper surface, being in contact with the lower end of the partition 70 in the middle of its upper surface, being in contact with the protrusions 72 of the grooves 66 at its sides, and being in contact with the protrusion 73 of the bottom 68. Into the both ends of the frame member 61, fixers 81 and 82 are inserted to thereby fix the base plate 62 to the frame member 61. The fixers 81 and 82 made of polycarbonate resin are formed to abut the ends of the frame member 61 to close the gaps between the frame member 61 and the base plate 62 at the both ends. On the under surface of each of the fixers 81 and 82, a protrusion 83 is formed. At the both ends of the base plate 62, through holes 84 which engage with the protrusions 83 of the fixers 81 and 82 is formed. This engagement prevents the base plate 62 from moving along the length.

In the linear light source of this structure, light emitted from the light emitting diode 63 is condensed by the lens 64 which is a convex bar lens and linearly irradiates the light irradiated surface. Since the reflecting surfaces 67a and 67b of the reflecting frames 65 facing to the lens 64 are inclined so that the width of the interior increases toward the top, scattered light is reflected by the reflecting surfaces 67a and 67b and is directed toward the lens 64. As a result, the reduction in quantity of light irradiation due to scattering is restrained.

Since the resistors 76 are arranged away from the line of the light emitting diodes 63, the light emitting diodes 63 can be arranged with smaller spaces. In a structure where the resistors are arranged between the light emitting diodes, it is difficult to arrange the light emitting diodes with spaces smaller than 10 mm. In this embodiment, however, the light emitting diodes can be arranged with the spaces of 3 mm. By arranging the light emitting diodes with smaller spaces, more number of light emitting diodes are arranged on the base plate 62. As a result, the illuminance on the light irradiated surface improves. For example, when the linear light source of this embodiment is used in an electrographic copying machine, the processing of A4 size paper sheets takes only approximately one second per sheet. The resistors 76 may be provided on the under surface of the base plate 62.

In the linear light source of this embodiment, the heat generated when the light emitting diodes are activated is released through the holes 74 and 75 provided in the frame member 61. In addition, since there is a gap between the base plate 62 and the bottom 68 of the frame member 61, the heat is easily released. Consequently, the heat is not accumulated inside the frame member 61 and the temperature increase of the base plate 62 is limited to a predetermined range. For this reason, the thermal expansion of the base plate 62 is small. Since the base plate 62 and the reflecting frame 65 are in contact in a small area, the thermal conduction from the base plate 62 to the reflecting frame 65 is small. For this reason, the temperature increase of the frame member 61 is restrained and the warp of the frame member 61 along the length is also prevented.

Moreover, since the base plate 62 is held by being fixed to the predetermined positions of the reflecting frames 65 and since the lens 64 and the reflecting frames 65 are integrated, the base plate 62 and the lens 64 always bear a predetermined positional relationship therebetween. As a result, it is unnecessary to adjust the positions of the lens 64 and the base plate 62, thereby simplifying the assembling process. Further, since the under surface and the sides of the base plate 62 are not in close contact with the grooves 66 into which it is inserted but in contact only with the protrusions 72 and 73, the frictional force is reduced and the base plate 62 is easily inserted into the grooves 66. It is preferable to provide the both ends of the protrusions 72 and 73 with an inclination which declines the protrusions, since the base plate 62 will be more smoothly inserted with such an inclination.

Obviously, many modifications and variations of the present invention are possible in light of the above teachings. It is therefore to be understood that within the scope of the appended claims, the invention may be practiced other than as specifically described.

What is claimed is:

1. A linear light source comprising:

a long frame member formed by integrating a lens and reflecting frames through extrusion molding of a resin so that a lower part of the frame member is open along an entire length thereof to release heat, said lens comprising a bar lens refracting and converging light and being located at an upper part of the frame member, said reflecting frames being located at both sides of the frame member, said reflecting frames each including a groove on an inner surface thereof inserting and receiving a long base plate therein, each groove being formed at a same height as each other and in parallel to the lens, said inner surface of said each reflecting frame facing an inner surface of another reflecting frame;

said long base plate held in the frame member by being substantially in close contact with the grooves; and a plurality of light emitting diodes arranged on an upper surface of the base plate along the length thereof so as to face the lens.

2. A linear light source according to claim 1, further comprising:

a first engagement portion provided in a vicinity of an end of the base plate; and a fixer having a second engagement portion which engages with the first engagement portion, said fixer being fitted in a gap between a bottom of the lens and the upper surface of the base plate in a vicinity of an end of the frame member and being substantially in contact with an end surface of the frame member, wherein said fixer is fitted between the lens and the base plate in the vicinity of the end of the frame member, and the first engagement portion and the second engagement portion engage with each other to fix the base plate and to close the end of the frame member.

3. A linear light source comprising:

a base plate on which a plurality of electrodes are separately formed;

a plurality of light emitting diodes arranged on the electrodes so as to be substantially in a line, one light emitting diode being disposed on one electrode;

reflecting frames fixed to the base plate so as to surround the light emitting diodes;

a lens arranged above the light emitting diodes, said lens being fixed to the reflecting frames;

a reflecting coat formed on the base plate; and a coating resin comprising a hardened quantity of a liquid resin applied so as to cover each of the light emitting diodes, where the reflecting coat is formed on the base plate except circular belt areas surrounding the light emitting diodes, and the coating resin is applied inside each of the areas, each of said belt areas preventing the liquid resin applied inside of the belt area from flowing out of the belt area so that the resin is hardened into a shape having a domed top with a circular bottom surface.

4. A linear light source according to claim 3, a coating resin is formed so as to have a domed top substantially at a midpoint between the light emitting diodes.

* * * * *